US010819153B2

(12) United States Patent
Wang et al.

(10) Patent No.: US 10,819,153 B2
(45) Date of Patent: Oct. 27, 2020

(54) WIRELESS POWER SUPPLY COMMUNICATION CIRCUIT FOR ELECTRIC COOKING POT, ELECTRIC COOKING POT AND METHOD FOR THE SAME

(71) Applicant: FOSHAN SHUNDE MIDEA ELECTRICAL HEATING APPLIANCES MANUFACTURING CO., LTD., Foshan (CN)

(72) Inventors: Yunfeng Wang, Foshan (CN); Fan Zhang, Foshan (CN); Wenkai Mei, Foshan (CN); Jun Lei, Foshan (CN); Zhanfeng Xiao, Foshan (CN); Jianxin Wu, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 289 days.

(21) Appl. No.: 15/914,795

(22) Filed: Mar. 7, 2018

(65) Prior Publication Data
US 2018/0198319 A1 Jul. 12, 2018

Related U.S. Application Data

(63) Continuation of application No. PCT/CN2015/100358, filed on Dec. 31, 2015.

(30) Foreign Application Priority Data

Dec. 28, 2015 (CN) .......................... 2015 1 1009754
Dec. 28, 2015 (CN) ...................... 2015 2 1117834 U

(51) Int. Cl.
*H01F 27/42* (2006.01)
*H01F 37/00* (2006.01)
(Continued)

(52) U.S. Cl.
CPC ............. *H02J 50/12* (2016.02); *A47J 27/004* (2013.01); *A47J 36/26* (2013.01); *H02J 50/80* (2016.02);
(Continued)

(58) Field of Classification Search
CPC ........ H02J 50/12; H02J 50/80; H04B 5/0037; A47J 27/004; A47J 36/06; A47J 36/26; H05B 6/12; H05B 1/0261
See application file for complete search history.

(56) References Cited

U.S. PATENT DOCUMENTS

2013/0147279 A1* 6/2013 Muratov ................. H02J 50/12
307/104
2017/0012470 A1* 1/2017 Nakano ................... H02J 50/12

FOREIGN PATENT DOCUMENTS

CN 2831987 Y 11/2006
CN 101694953 A 4/2010
(Continued)

OTHER PUBLICATIONS

Foshan Shunde Midea Electrical Heating Appliances; Midea Group Co. Ltd., International Search Report and Written-Opinion, PCT/CN2015/100358, Jun. 1, 2016, 11 pgs.

*Primary Examiner* — Rexford N Barnie
*Assistant Examiner* — Rasem Mourad
(74) *Attorney, Agent, or Firm* — Morgan, Lewis & Bockius LLP

(57) ABSTRACT

The present disclosure provides a wireless power supply communication circuit for an electric cooking pot, an electric cooking pot and a method thereof. The electric cooking pot comprises a pot body, an upper cover and the wireless power supply communication circuit, wherein an insertion base is provided on the pot body; an insertion cavity is provided on the upper cover; the insertion base is movably inserted the insertion cavity cooperatively; a first coil is
(Continued)

provided on the insertion base, a second coil resonance circuit is provided in or near the insertion cavity; a pot body control unit is provided on the pot body, an upper cover control unit is provided on the upper cover. The present disclosure allows the information interaction by detecting the amplitude changes of the resonant wave, so that the wireless power supply and communication can be simultaneously provided.

13 Claims, 8 Drawing Sheets

(51) Int. Cl.
*H01F 38/00* (2006.01)
*H02J 50/12* (2016.01)
*A47J 27/00* (2006.01)
*H05B 6/12* (2006.01)
*H05B 1/02* (2006.01)
*H05B 6/06* (2006.01)
*H02J 50/80* (2016.01)
*A47J 36/26* (2006.01)

(52) U.S. Cl.
CPC ............. *H05B 1/0261* (2013.01); *H05B 6/06* (2013.01); *H05B 6/12* (2013.01)

(56) References Cited

FOREIGN PATENT DOCUMENTS

| | | | |
|---|---|---|---|
| CN | 201612491 U | * | 10/2010 |
| CN | 201612491 U | | 10/2010 |
| CN | 201654980 U | | 11/2010 |
| CN | 101936554 A | | 1/2011 |
| JP | 2009049880 A | * | 3/2009 ........... H05B 6/1236 |
| WO | WO2015032419 A1 | | 3/2015 |

* cited by examiner

WIRELESS POWER SUPPLY COMMUNICATION CIRCUIT FOR ELECTRIC COOKING POT, ELECTRIC COOKING POT AND METHOD FOR THE SAME

PRIORITY CLAIM AND RELATED APPLICATION

This application is a continuation application of PCT/CN2015/100358, entitled "WIRELESS POWER SUPPLY COMMUNICATION CIRCUIT FOR ELECTRIC COOKING POT, ELECTRIC COOKING POT AND METHOD FOR THE SAME" filed on Dec. 31, 2015, which claims priority to (i) Chinese Patent Application No. 201511009754.4, filed with the State Intellectual Property Office of the People's Republic of China on Dec. 28, 2015, and (ii) Chinese Patent Application No. 201521117834.7, filed with the State Intellectual Property Office of the People's Republic of China on Dec. 31, 2015, all of which are incorporated herein by reference in their entirety.

FIELD OF TECHNOLOGY

The present disclosure relates to the field of household appliances, and particularly to a wireless power supply communication circuit for an electric cooking pot, the electric cooking pot having the same and a method thereof.

BACKGROUND

An integral structure is adopted by the current existing electric cooking pots, in which an upper cover is coupled to a power source in the bottom via a connecting wire so as to be powered up for electrical functions. However, the upper cover cannot be disassembled and it is hard to be cleaned up, such that a lot of functions requiring the power supply from the upper cover are not easy to be performed, such as controlling the pressure within the pot with an electromagnetic valve, detecting the temperature within the pot and the like. However, if a separated structure is adopted by the electric cooking pots, the electrical functions cannot be performed by the upper cover since the upper cover cannot couple with the power source in the bottom.

SUMMARY (I) Technical Problem to be Solved

The technical problem to be solved by the present disclosure is: how to achieve the wireless transmission of power and signal between the upper cover and pot body when they are separated.

(II) Technical Solutions

The present disclosure adopts the following technical solutions:

In one aspect, the present disclosure provides a wireless power supply communication circuit for an electric cooking pot, which comprises: a pot body; an upper cover; a first coil, arranged on the pot body; a pot body control unit, arranged on the pot body, coupled to the first coil; an upper cover control unit, arranged on the upper cover; and a second coil resonance circuit, arranged on the upper cover, coupled to the upper cover control unit;

wherein, the first coil is configured to electromagnetically induct with a second coil resonance circuit during power-on so that the second coil resonance circuit generates current or voltage;

wherein, the pot body control unit is configured to obtain change signals of the current or voltage resonant wave generated by the electromagnetic induction between the first coil and the second coil resonance circuit during the power supply and communication of the circuit, and demodulate the change signals into cooking signals;

wherein, the second coil resonance circuit is configured to transmit the generated current or voltage to the upper cover control unit; and wherein, the upper cover control unit is configured to send a data signal to act on the second coil resonance circuit after power-on, so as to change the amplitude of the current or voltage resonant wave generated by the electromagnetic induction between the second coil resonance circuit and the first coil.

In some embodiments, the pot body control unit comprises a controller, a power panel, a heating assembly and a demodulation module, wherein, the power panel is coupled to the controller which is coupled to the heating assembly, the first coil and the demodulation module which is coupled to the first coil; the demodulation module is configured to obtain the change signals of the current or voltage resonant wave generated by the electromagnetic induction between the first coil and the second coil resonance circuit during the power supply and communication of the circuit, and demodulate the change signals into the cooking signals.

In some embodiments, the upper cover control unit comprises a rectification module, a functional device, a processing chip and a carrier communication module, the rectification module is coupled to the second coil resonance circuit, the functional device and the processing chip are coupled to the rectification module, the functional device is coupled to the processing chip; the processing chip is coupled to the carrier communication module and configured to send a data signal to the carrier communication module; the carrier communication module is coupled to the second coil resonance circuit, and configured to act on the second coil resonance circuit, so as to change the amplitude of the current or voltage resonant wave generated by the electromagnetic induction between the second coil resonance circuit and the first coil after receiving the data signal.

In some embodiments, the second coil resonance circuit comprises a second coil, and at least one first capacitor coupled to two ends of the second coil and arranged in parallel with each other, the two ends of the second coil are coupled to the rectification module.

In some embodiments, the second coil resonance circuit comprises a second coil, at least one first capacitor coupled to two ends of the second coil and arranged in parallel with each other, and a second capacitor coupled in series with the first capacitor, the two ends of the second coil are coupled to the rectification module.

In some embodiments, the carrier communication module comprises a switch device and a first resonance capacitor coupled to the switch device, the switch device is coupled to the processing chip, the first resonance capacitor is coupled to the second coil resonance circuit, wherein, the switch device conducts after receiving the data signal, so that the first resonance capacitor acts on the second coil resonance circuit to change the amplitude of the current or voltage resonant wave generated by the electromagnetic induction between the second coil resonance circuit and the first coil.

In some embodiments, the switch device is a first MOS transistor and, a G electrode of which is coupled to a signal output end of the processing chip, a S electrode of which is grounded, a D electrode of which is coupled to one end of the first resonance capacitor, and the other end of the first resonance capacitor is coupled to the second coil resonance circuit.

In some embodiments, the wireless power supply communication circuit further comprises a shunt resistor, one end of which is coupled to the G electrode of the first MOS transistor, and the other end of which is coupled to a signal output end of the upper cover control unit.

In some embodiments, the wireless power supply communication circuit further comprises a first resistor, one end of which is coupled to the G electrode of the first MOS transistor, and the other end of which is grounded.

In some embodiments, the first coil and the second coil are coaxially arranged.

In another aspect, the present disclosure further provides an electric cooking pot, which comprises the wireless power supply communication circuit above.

In another aspect, the present disclosure further provides an electric cooking pot, which comprises a pot body, an upper cover and the wireless power supply communication circuit above, wherein, an insertion base is provided on the pot body; an insertion cavity is provided on the upper cover, the insertion base movably inserts the insertion cavity cooperatively; and a first coil is provided on the insertion base, a second coil resonance circuit is provided in or near the insertion cavity; a pot body control unit is provided on the pot body, an upper cover control unit is provided on the upper cover.

In some embodiments, the insertion base is hinged on an articulated shaft arranged on the pot body.

In some embodiments, the rotation angle of the insertion base about the articulated shaft is 0-95°.

In some embodiments, the insertion base comprises a base hinged on the articulated shaft, and an insertion head vertical to the plane of the base is provided above the base; the insertion cavity comprises a base cavity and an insertion head cavity, the base inserts the base cavity cooperatively, and the insertion head inserts the insertion head cavity cooperatively.

In some embodiments, the first coil is arranged in the insertion head.

In some embodiments, the insertion base and the insertion cavity are connected by movable engagement.

In some embodiments, a chuck slot is provided in the insertion cavity, and an elastic chuck is provided on the surface of the insertion base, the elastic chuck engages with the chuck slot.

In another aspect, the present disclosure further provides a wireless power supply communication method for an electric cooking pot, which comprises:

enabling a powered-on first coil and a second coil resonance circuit to electromagnetically induct so as to transmit current or voltage to an upper cover control unit;

the powered-on upper cover control unit sending a data signal to a carrier communication module;

the powered-on upper cover control unit sending the data signal to act on the second coil resonance circuit, so as to change the amplitude of the current or voltage resonant wave generated by the electromagnetic induction between the second coil resonance circuit and the first coil;

a pot body control unit obtaining the change signals of the current or voltage resonant wave generated by the electromagnetic induction between the first coil and the second coil resonance circuit during the power supply and communication of the circuit, and demodulating the change signals into cooking signals.

(III) Technical Advantages (1) The present disclosure generates current or voltage by the electromagnetic induction of the oppositely arranged coils, and achieves the information interaction by detecting the amplitude changes of the resonant wave, so as to solve the problem in the conventional electric pot in which the wireless power supply and communication cannot be simultaneously provided.

(2) The present disclosure achieves the separation between the pot body and the upper cover by the cooperative insertion between the insertion base and the insertion cavity.

DESCRIPTION OF REFERENCE NUMERALS

1: second coil; 2: carrier communication module; 3: rectification module; 4: functional device; 5: second coil resonance circuit; 6: pot body; 7: upper cover; 8: insertion base; 9: insertion cavity; 10: first coil; 11: insertion head cavity; 12: articulated shaft; 13: base; 14: insertion head; 15: base cavity.

DESCRIPTION OF THE EMBODIMENTS

Hereinafter, the specific implementations of the present disclosure are further described with reference to the accompanying drawings and the embodiments. The following embodiments are for illustrating the present disclosure, but not for limiting the scope thereof.

Figure 1:
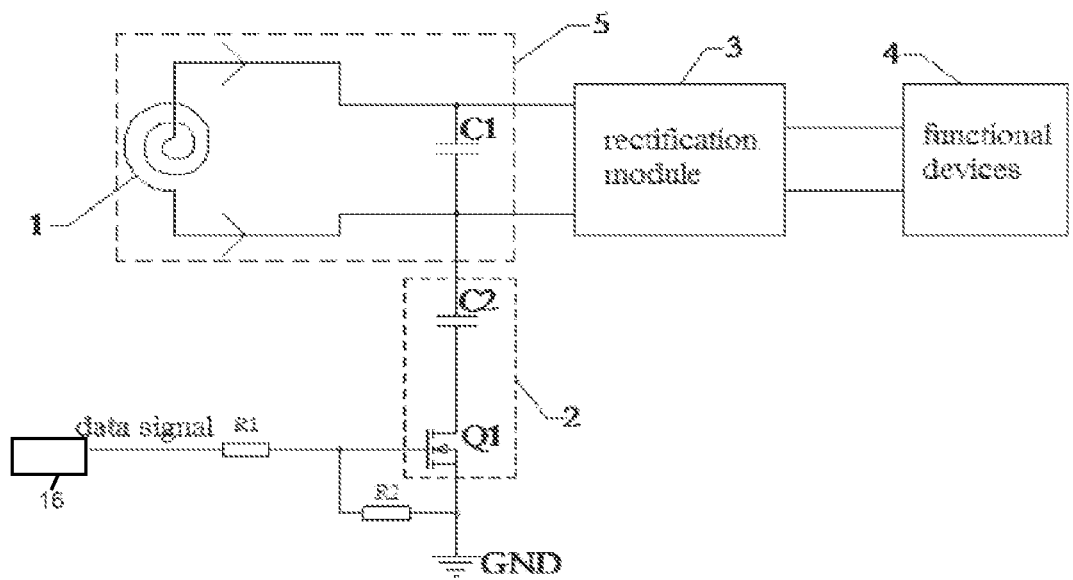
FIG. 1 is a structure diagram of the wireless power supply communication circuit according to embodiment 1 of the present disclosure.
Figure 2:
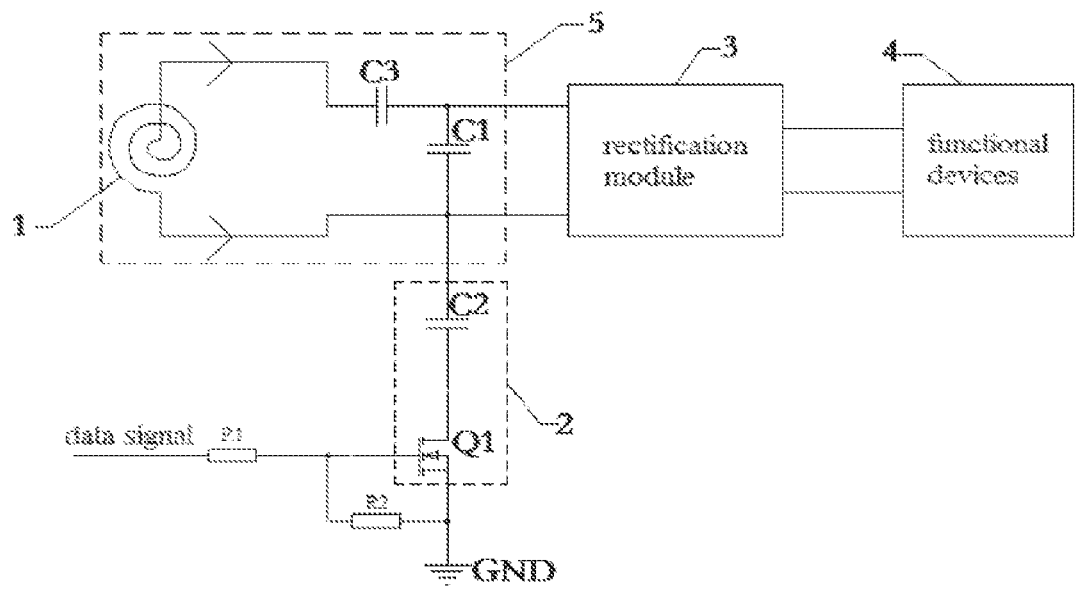
FIG. 2 is a structure diagram of the wireless power supply communication circuit according to embodiment 2 of the present disclosure.

FIG. 1 illustrates a wireless power supply communication circuit for an electric cooking pot according to embodiment 1 of the present disclosure, the circuit comprises: a pot body control unit and a first coil (not shown) arranged on a pot body, and a second coil resonance circuit 5 and an upper cover control unit arranged on an upper cover. The pot body control unit comprises a controller, a heating assembly, a power panel and a demodulation module. The power panel is coupled to the controller which is coupled to the heating assembly, and the first coil and the demodulation module which is coupled to the first coil. The upper cover control unit comprises a rectification module 3, a functional device 4, a processing chip 16 and a carrier communication module 2. The rectification module 3 is coupled to the second coil resonance circuit 5, the functional device 4 and the processing chip 16 are coupled to the rectification module 3, and the functional device 4 is coupled to the processing chip 16. The processing chip 16 is coupled to the carrier communication module 2. The carrier communication module 2 is coupled to the second coil resonance circuit 5. The second coil resonance circuit 5 comprises a second coil 1, and at least one first capacitor C1 coupled to two ends of the second coil 1 and arranged in parallel with each other. The first capacitor C1 is shown in FIG. 1. Alternatively, as shown in FIG. 2 according to embodiment 2, the second coil resonance circuit 5 comprises the second coil 1, at least one first capacitor C1 coupled to two ends of the second coil 1 and arranged in parallel with each other, and a second capacitor C3 arranged in series with the first capacitor C1.

The first coil is coupled to the controller which is coupled to the power panel, so as to obtain a working voltage. The first coil and the second coil 1 are coaxially arranged, for electromagnetically inducing with the second coil 1 and the first capacitor C1 during power-on so that the second coil 1 generates current or voltage.

The second coil resonance circuit 5 is coupled to the rectification module 3, so as to convert the alternating current into the direct current after rectification and transfers current or voltage to the functional device 4, the processing chip and the carrier communication module 2, so that the functional device 4, the processing chip and the carrier communication module 2 are able to work. Wherein, the functional device 4 comprises one or more of the existing functional devices such as an upper cover temperature detector, an electromagnetic valve, an electromagnetic coil, a display screen and the like.

The present disclosure generates the available current or voltage required by the functional device and the processing chip 16 by the electromagnetic induction of the first coil, the second coil 1 and the first capacitor C1, therefore the wireless power supply from the pot body to the upper cover is achieved.

The cooking pot needs to operate correspondingly according to the cooking signals during cooking. The load of the upper cover generates cooking state signals during operation, and the cooking pot sends the corresponding cooking instruction signals under an operation state. These signals need to be fed back to the controller on the pot body after being received by the processing chip 16. The controller obtains the cooking signals by interpreting these signals and generates the corresponding instructions according to the signals. Therefore, the communication signals may be obtained by the carrier through the waveform changes, in order to achieve the wireless transmission signals between the pot body and the upper cover. Therefore, in the present disclosure, the signals may be transmitted to the carrier communication module 2.

Figure 3:
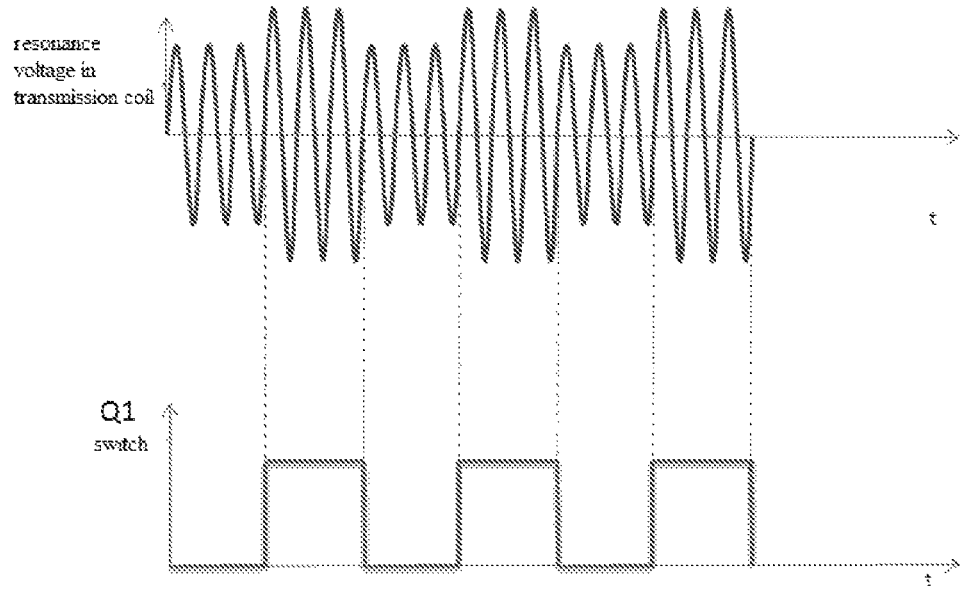
FIG. 3 is a schematic diagram of the waveform changes of the resonant wave according to the present disclosure.

The carrier communication module 2 is coupled to the second coil resonance circuit 5, for acting on the second coil resonance circuit 5 after receiving the data information, so as to change the amplitude of the current or voltage resonant wave generated by the electromagnetic induction between the first coil and the second coil resonance circuit 5 (as shown in FIG. 3). Wherein, the transmission coil in the figure is the second coil 1. The amplitude of the current or voltage resonant wave shown in FIG. 3 is under a changing state. The demodulation module is coupled to the first coil, so as to enable obtaining the changing signals of the current or voltage resonant wave generated by the electromagnetic induction between the first coil and the second coil resonance circuit 5 during the power supply and communication of the circuit, demodulating the changing signals into the cooking signals, and eventually feeding the cooking signals back to the controller.

As shown in FIG. 1, the carrier communication module 2 comprises a first MOS transistor Q1 and a first resonance capacitor C2. The G electrode of the first MOS transistor Q1 is coupled to the signal output end of the processing chip 16, the S electrode of the first MOS transistor is grounded, and the D electrode of the first MOS transistor Q1 is coupled to one end of the first resonance capacitor C2. The other end of the first resonance capacitor C2 is coupled to the second coil resonance circuit 5. In the figure, the first resonance capacitor C2 is coupled to the first capacitor C1.

The first MOS transistor Q1 receives the data signal so as to be conducting, and thus the first resonance capacitor C2 is within the operating circuit of the second coil resonance circuit 5 after the first MOS transistor Q1 becomes conducting. The first resonance capacitor C2 participates in the resonance operation of the current or voltage generated by the first coil and the second coil 1, so as to change the amplitude of the resonant wave during the power supply of the first coil and the second coil 1.

To further illustrate, the carrier communication module 2 further comprises a shunt resistor R1, one end of which is coupled to the G electrode of the first MOS transistor Q1, and the other end of which is coupled to the signal output end of an upper cover electric device.

To further illustrate, the carrier communication module 2 further comprises a first resistor R2, one end of which is coupled to the G electrode of the first MOS transistor Q1, and the other end of which is grounded. When the circuit fails, the first resistor R2 may prohibit the first MOS transistor Q1 from being conducting.

When transmitting data, the first MOS transistor Q1 is switched on so that the first resonance capacitor C2 participates in the resonance, and thus the resonance state changes, which results in the amplitude changes of the resonant wave, and it is further demodulated to achieve the purpose of signal feedback.

The present disclosure generates current or voltage by the electromagnetic induction of the oppositely arranged coils, and achieves the information interaction by detecting the amplitude changes of the resonant wave, so as to solve the problem in the conventional electric pot in which the wireless power supply and communication cannot be simultaneously provided.

Figure 4:
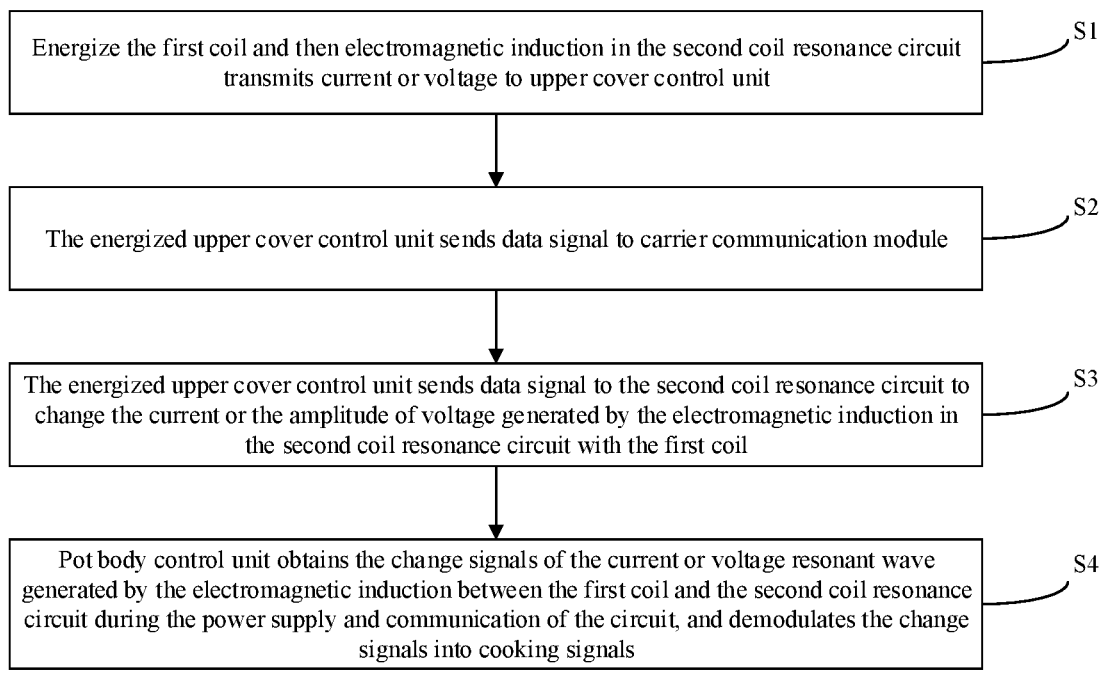
FIG. 4 is a schematic flowchart of the wireless power supply communication method according to embodiment 3 of the present disclosure.

Embodiment 3: as illustrated in FIG. 4, the present disclosure provides a wireless power supply communication method for an electric cooking pot, the method comprising:

S1. enabling a powered-on first coil and a second coil resonance circuit to electromagnetically induct so as to transmit current or voltage to an upper cover control unit;

S2. the powered-on upper cover control unit sending a data signal to a carrier communication module;

S3. the powered-on upper cover control unit sending the data signal to act on the second coil resonance circuit, so as to change the amplitude of the current or voltage resonant wave generated by the electromagnetic induction between the second coil resonance circuit and the first coil; and S4. a pot body control unit obtaining the change signals of the current or voltage resonant wave generated by the electromagnetic induction between the first coil and the second coil resonance circuit during the power supply and communication of the circuit, and demodulating the change signals into cooking signals.

The present disclosure generates current or voltage by the electromagnetic induction of the oppositely arranged coils, and achieves the information interaction by detecting the amplitude changes of the resonant wave, so as to solve the problem in the conventional electric pot in which the wireless power supply and communication cannot be simultaneously provided.

Embodiment 4: the present disclosure provides an electric cooking pot, comprising the wireless power supply communication circuit above. In the present embodiment, the wireless power supply communication circuit is provided on the electric cooking pot and the power or signal can be wireless transmitted.

Figure 5:
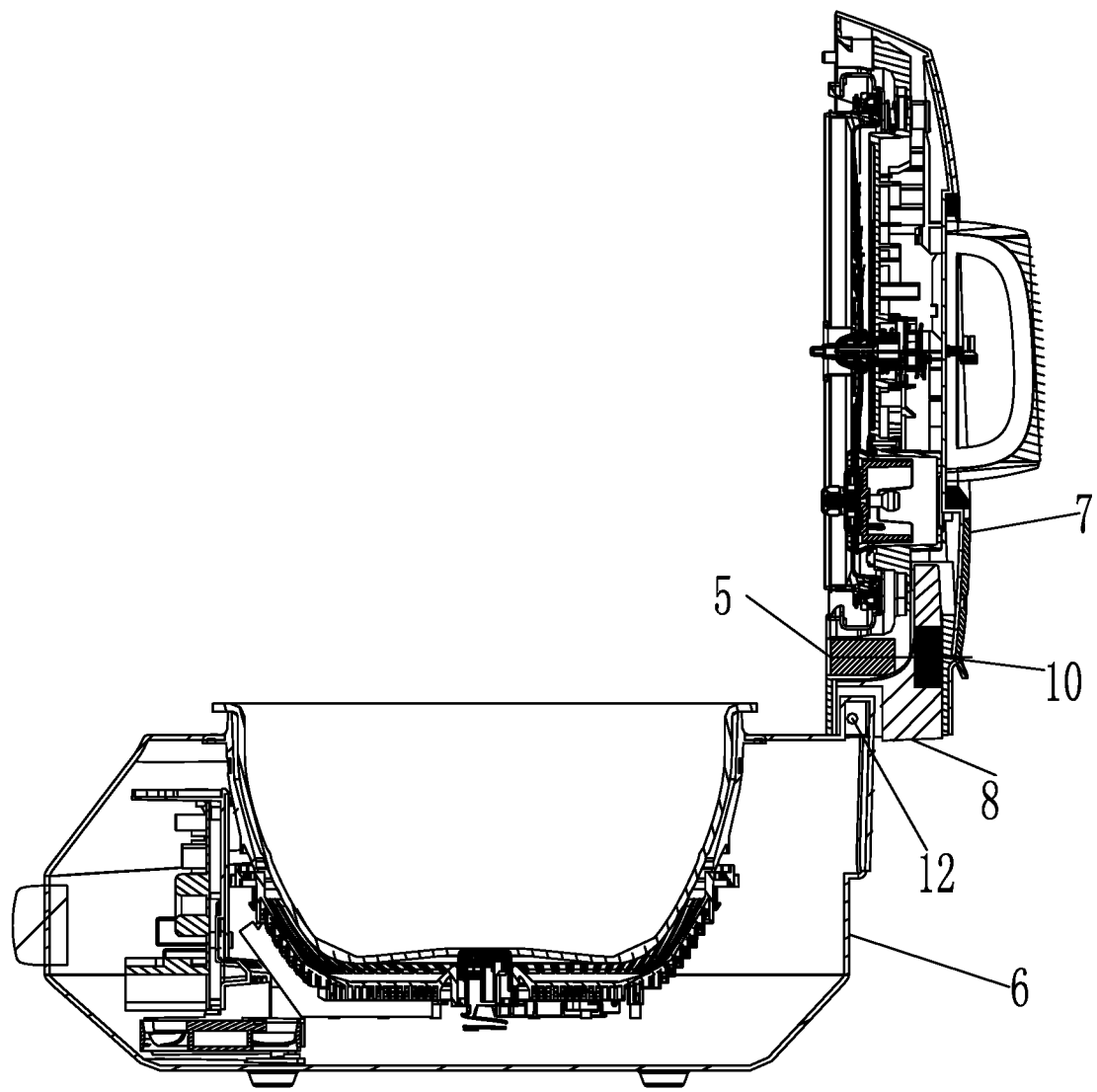
FIG. 5 is a structure diagram of the electric cooking pot according to embodiment 5 of the present disclosure.
Figure 6:
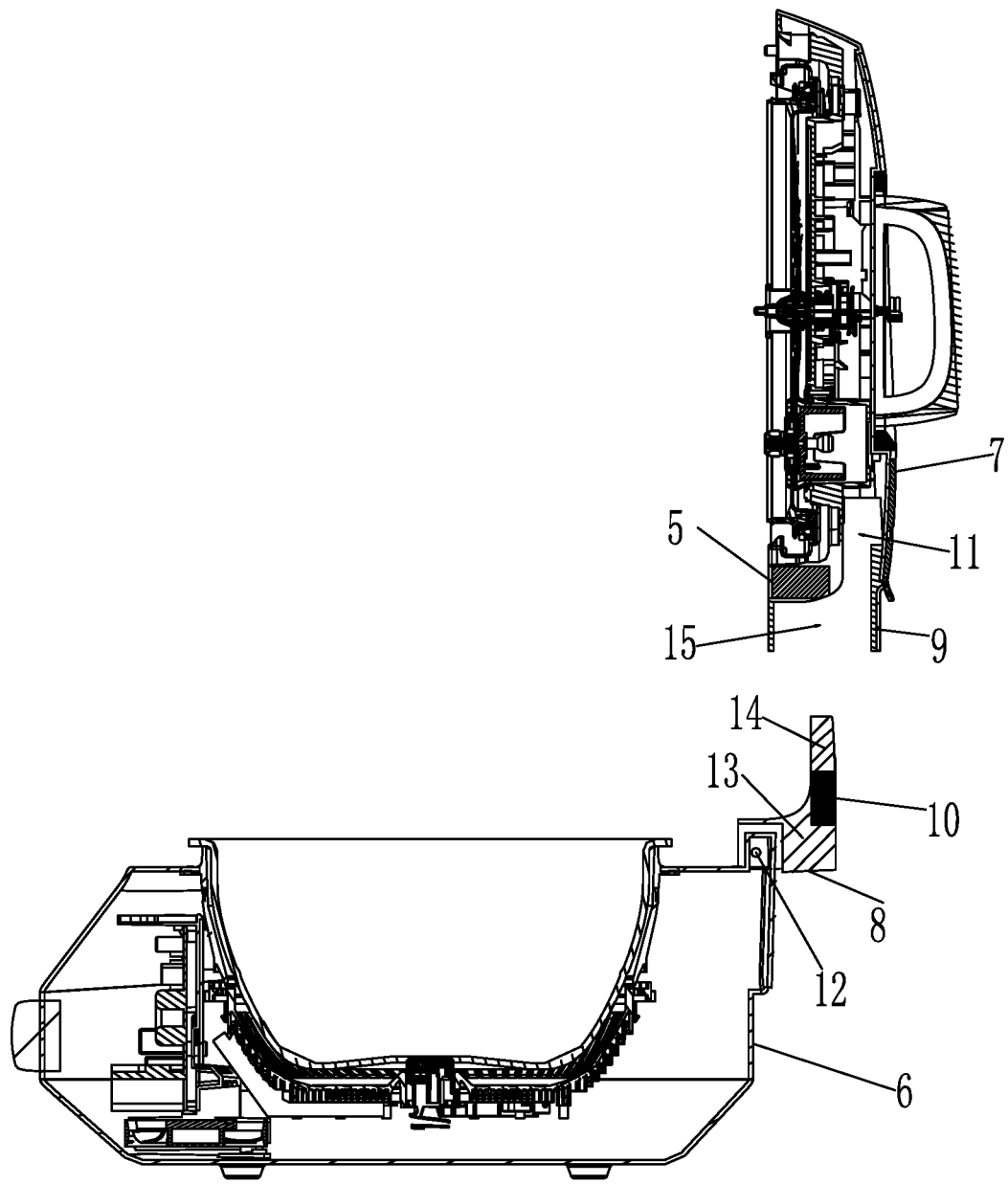
FIG. 6 is a state schematic diagram of the separation between the upper cover and the pot body in FIG. 5.
Figure 7:
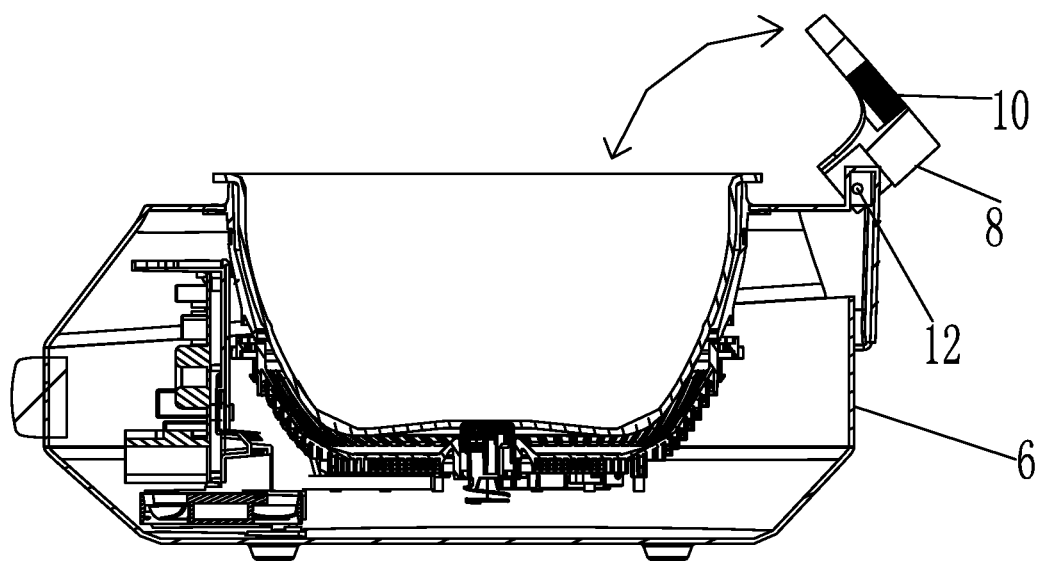
FIG. 7 is a structure diagram of the pot body in FIG. 5.

Embodiment 5: as illustrated in FIG. 5-7, embodiment 5 of the present disclosure provides an electric cooking pot, comprising: a pot body 6, an upper cover 7 and the wireless power supply communication circuit above (not shown in the figures), wherein, an articulated shaft 12 is provided on the pot body 6, an insertion base 8 is hinged on the articulated shaft 12, an insertion cavity 9 is provided on the upper cover 7, and the insertion base 8 inserts the insertion cavity 9 cooperatively. A first coil 10 is provided on the insertion base 8, and a second coil resonance circuit 5 is provided in or near the insertion cavity 9. A pot body control unit (not shown in the figures) is provided on the pot body, and an upper cover control unit (not shown in the figures) is provided on the upper cover 7. The wireless power supply communication circuit according to embodiment 1 achieves the wireless transmission of power and signal between the upper cover and the pot body. The repetitive descriptions are omitted herein.

To further illustrate, the insertion base 8 comprises a base 13 hinged on the articulated shaft 12, and an insertion head 14 which is vertical to the plane of the base 13 is provided above the base 13. The insertion cavity 9 comprises a base cavity 15 and an insertion head cavity 11, the base 13 inserts the base cavity 15 cooperatively, and the insertion head 14 inserts the insertion head cavity 11 cooperatively. The insertion between the base 13 and the base cavity 15 may improve the stability of the upper cover 7 inserting the insertion base 8, and the insertion between the insertion head 14 and the insertion head cavity 11 may improve the induction stability of two wireless transmission devices. The pot body wireless transmission device may be arranged in the insertion head 14 which is inserted in the insertion head cavity 11, thus the induction is stable; and since the insertion head 14 is in the entire cavity, the waterproof effect is better and the service life is extended.

Figure 12:
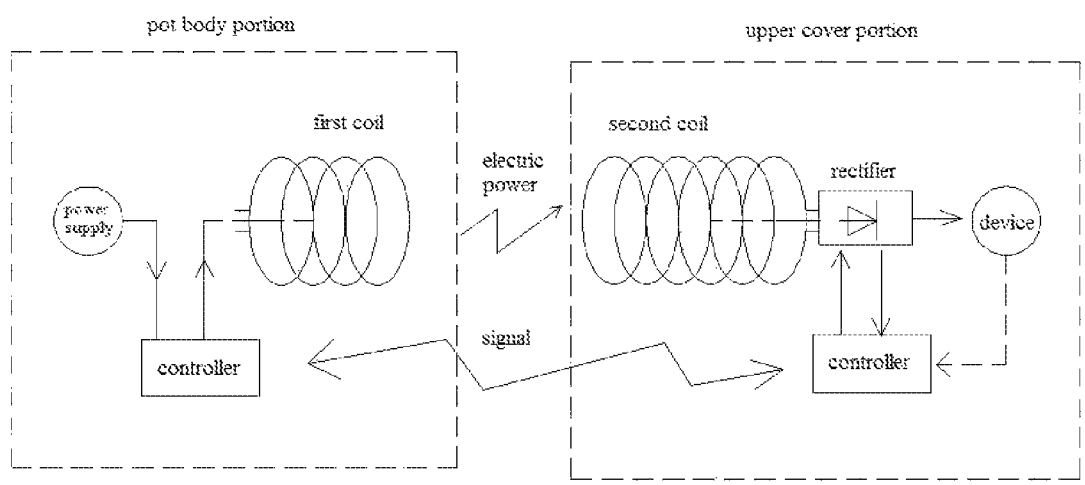
FIG. 12 is a schematic diagram of the wireless transmission of the electric cooking pot according to embodiments 5-7 of the present disclosure.

As illustrated in FIG. 12, in the present disclosure, the second coil resonance circuit 5 of the upper cover 7 generates current by the electromagnetic induction principle between the coils, so as to provide power to the upper cover electric device. Meanwhile, the signals of the upper cover electric device are fed back to the control panel on the pot body. In addition, it should be noted that, in order to facilitate the opening and closing between the pot body and the upper cover, the rotation angle of the insertion base 8 about the articulated shaft 12 is 0-95°. The upper cover 7 may swing with a hinge mount of the articulated shaft 12 to a horizontal position and close, and may also swing with the hinge mount of the articulated shaft 12 to a 95° position, where the upper cover 7 can be easily removed.

In the electric cooking pot of the present embodiment, the insertion base 8 is hinged on the pot body and able to rotate freely within a certain angle range, meanwhile the insertion cavity 9 on the upper cover 7 is inserted on the insertion base 8, so that the upper cover 7 can perform the wireless transmission of power and signal when it is under a closing or opening state with the pot body.

Figure 8:
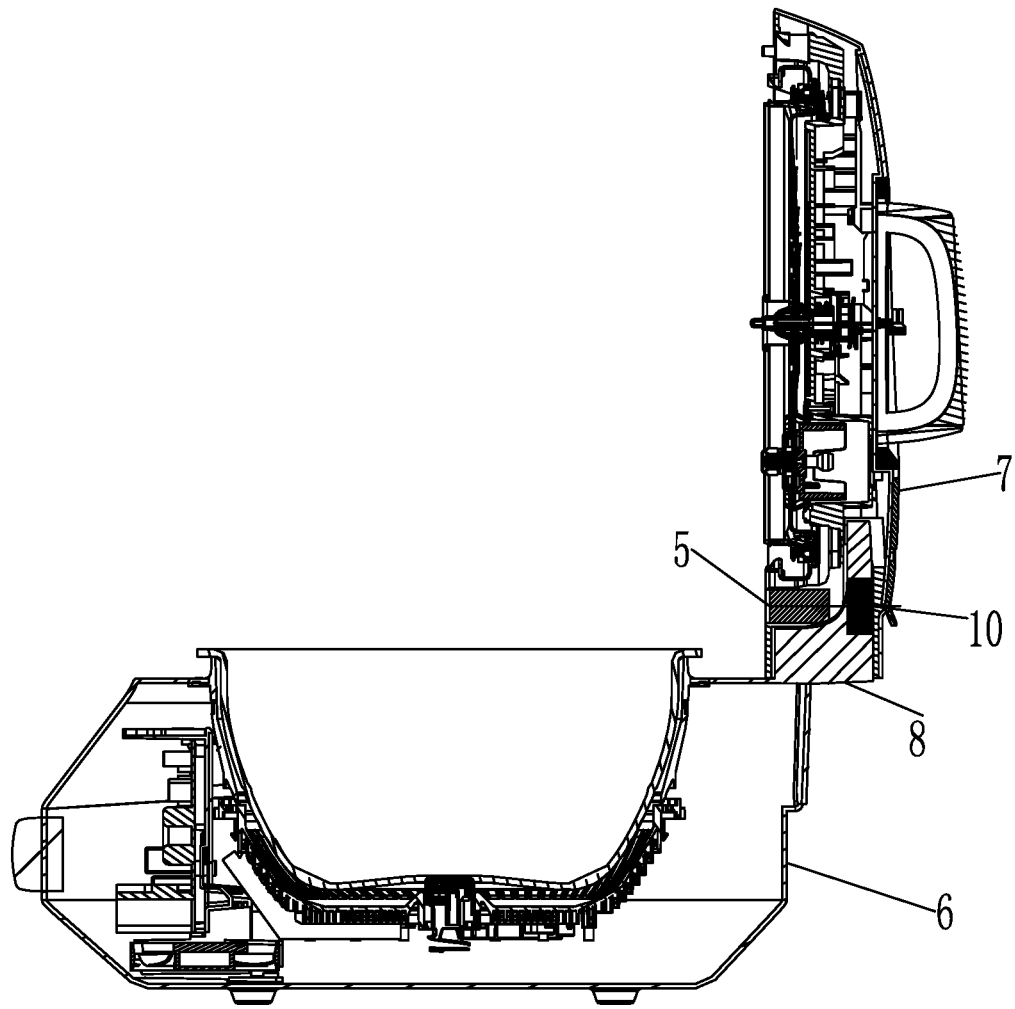
FIG. 8 is a structure diagram of the electric cooking pot according to embodiment 6 of the present disclosure.
Figure 9:
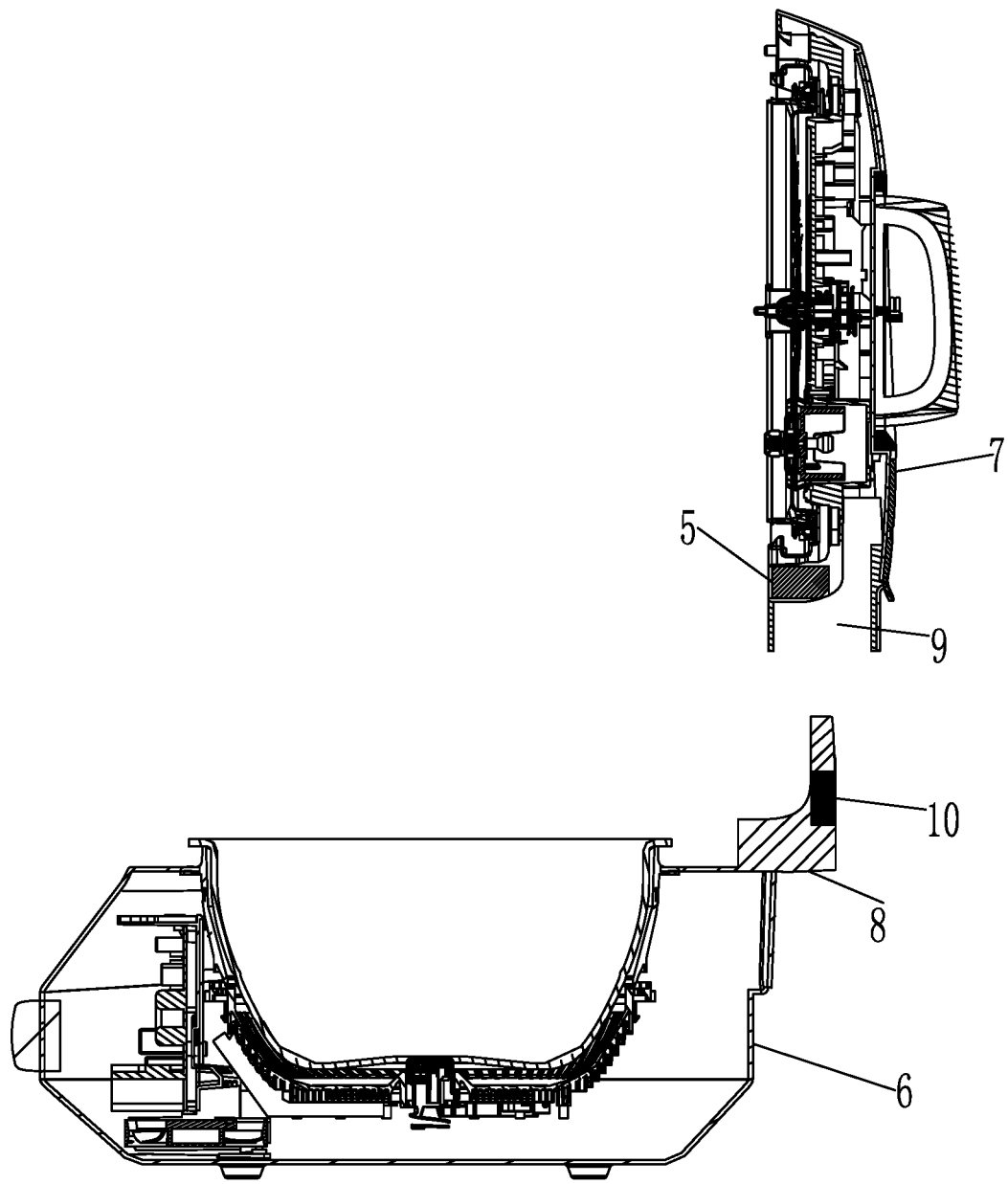
FIG. 9 is a state schematic diagram of the separation between the upper cover and the pot body in FIG. 8.

Embodiment 6: as shown in FIG. 8 to FIG. 9, the present disclosure provides an electric cooking pot. The difference between the present embodiment and embodiment 5 is: the insertion base 8 is fixed on the edge of the pot body. When the upper cover 7 is in an opening state, it may be inserted on the insertion base 8 through the insertion cavity 9, so that the cooking function can be performed when the upper cover 7 is open.

Figure 10:
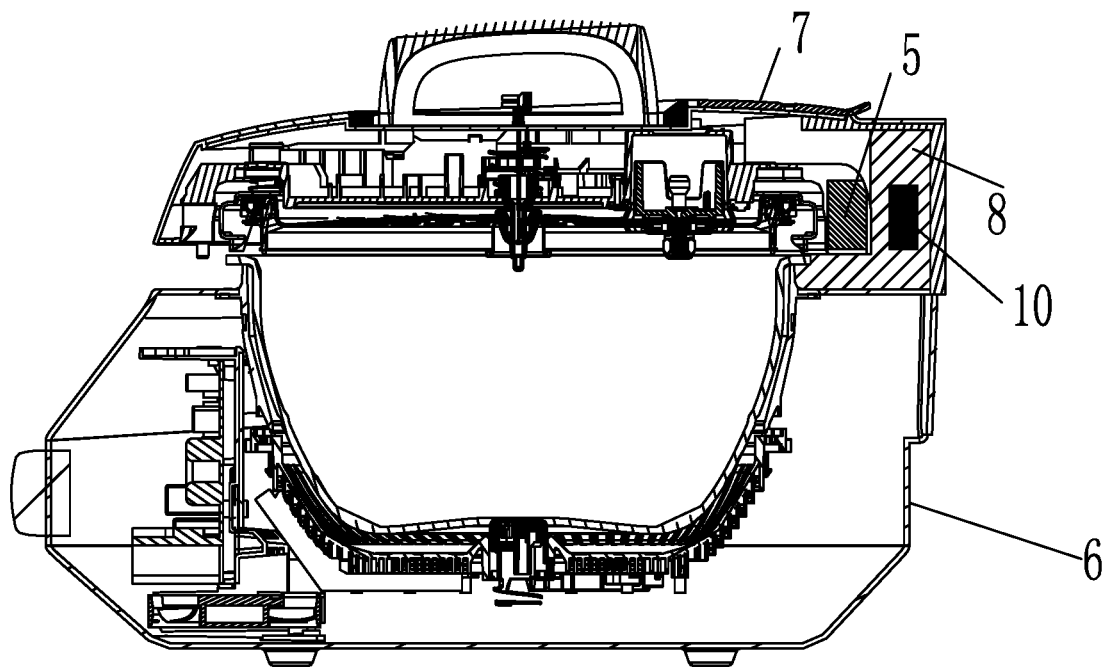
FIG. 10 is a structure diagram of the electric cooking pot according to embodiment 7 of the present disclosure.
Figure 11:
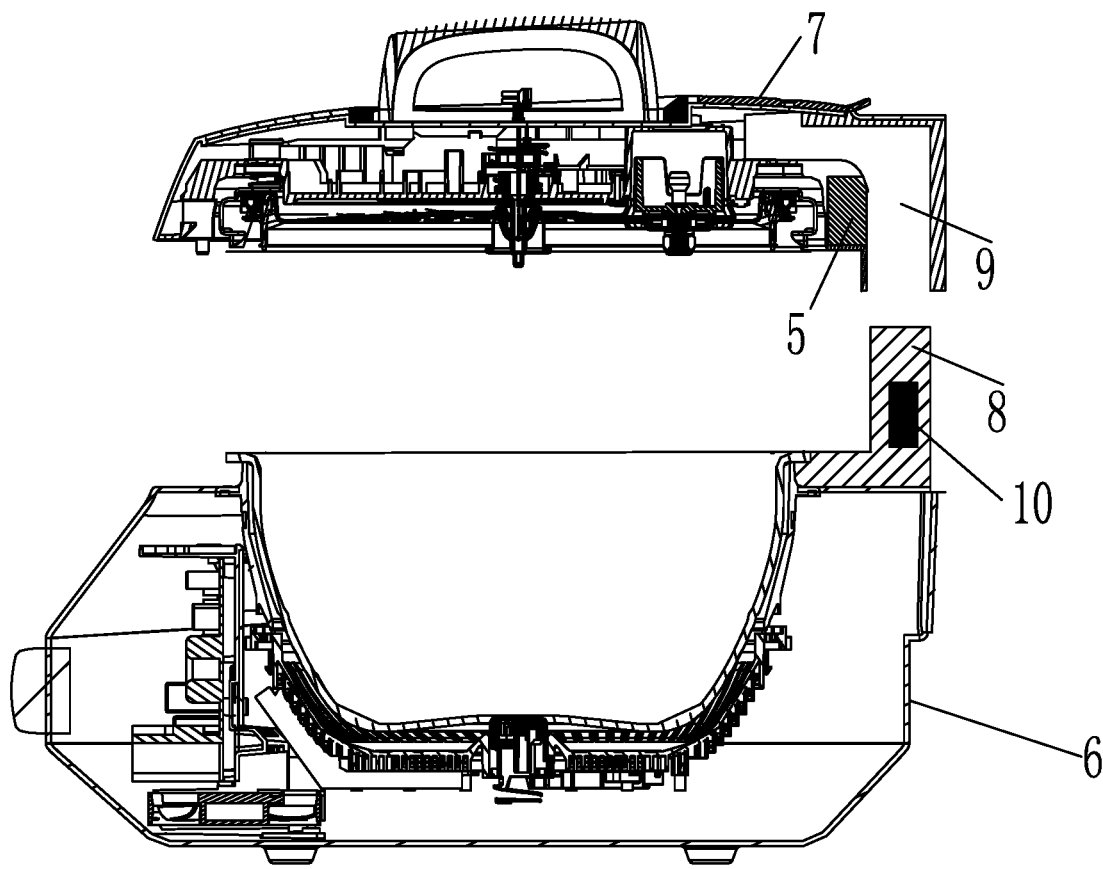
FIG. 11 is a state schematic diagram of the separation between the upper cover and the pot body in FIG. 10.

Embodiment 7: as shown in FIG. 10 to FIG. 11, the present disclosure provides an electric cooking pot. The difference between the present embodiment and embodiment 5 is: the insertion base 8 is fixed on the edge of the pot body. When the upper cover 7 is in a closing state, it may be inserted on the insertion base 8 through the insertion cavity 9, so that the cooking function under the closing state is performed.

Embodiment 8: the present disclosure provides an electric cooking pot. In the present embodiment, the upper cover 7 may be provided with two insertion cavities (not shown in the figure), one of which is for inserting the upper cover 7 on the insertion base 8 when the upper cover 7 covers the pot body, so as to achieve the cooking function when the upper cover 7 is in the closing state. The other insertion cavity is for achieving the cooking function when the upper cover 7 is in the opening state.

Embodiment 9: the present disclosure provides an electric cooking pot. In order to prevent the upper cover 7 separating from the pot body too easily, the insertion base 8 and the insertion cavity 9 may be connected by movable engagement. Specifically, a chuck slot (not shown in the figure) is provided in the insertion cavity 9, and an elastic chuck is provided on the surface of the insertion base 8, the elastic chuck engages with the chuck slot. Even if the above chuck and chuck slot are provided, the upper cover 7 can still be detached from the pot body due to the elasticity.

The above embodiments are only for illustrating the present disclosure, but not intended to limit the present disclosure. Various changes and modifications may be made without departing from the spirit and scope of the present disclosure by those of ordinary skill in the related arts. Therefore, all equivalent technical solutions are also within the protection scope of the present disclosure.

What is claimed is:

1. A wireless power supply communication circuit for an electric cooking pot having a pot body and an upper cover, the wireless power supply communication circuit comprising: a first coil, arranged on the pot body; a pot body control unit, arranged on the pot body and coupled to the first coil; an upper cover control unit, arranged on the upper cover, wherein the upper cover control unit comprises: a rectification module, a functional device, a processing chip, and a carrier communication module, wherein the carrier communication module comprises a switch device and a first resonance capacitor coupled to the switch device, the switch device is coupled to the processing chip, the first resonance capacitor is coupled to a second coil resonance circuit, wherein, the switch device conducts after receiving a data signal, so that the first resonance capacitor acts on the second coil resonance circuit to change an amplitude of a current or voltage resonant wave generated by electromagnetic induction between the second coil resonance circuit and the first coil, wherein the switch device is a first MOS transistor, a G electrode of which is coupled to a signal output end of the processing chip, a S electrode of which is grounded, a D electrode of which is coupled to one end of the first resonance capacitor, and the other end of the first resonance capacitor is coupled to the second coil resonance circuit; the second coil resonance circuit, arranged on the upper cover and coupled to the upper cover control unit; a shunt resistor, one end of which is coupled to the G electrode of the first MOS transistor, and the other end of which is coupled to a signal output end of the upper cover control unit, and a first resistor, one end of which is coupled to the G electrode of the first MOS transistor, and the other end of which is grounded, wherein, the first coil is configured to electromagnetically induct with the second coil resonance circuit during power-on so that the second coil resonance circuit generates current or voltage; wherein the pot body control unit is configured to obtain change signals of the current or voltage resonant wave generated by the electromagnetic induction between the first coil and the second coil resonance circuit during power supply and communication of the circuit, and demodulate the change signals into cooking signals; wherein, the second coil resonance circuit is configured to transmit the generated current or voltage to the upper cover control unit; and wherein, the upper cover control unit is configured to send the data signal to act on the second coil resonance circuit after the power-on, so as to change an amplitude of the current or voltage resonant wave generated by the electromagnetic induction between the second coil resonance circuit and the first coil.

2. The wireless power supply communication circuit of claim 1, wherein the rectification module is coupled to the second coil resonance circuit, the functional device and the processing chip are coupled to the rectification module, the functional device is coupled to the processing chip; the processing chip is coupled to the carrier communication module and configured to send a data signal to the carrier communication module; the carrier communication module is coupled to the second coil resonance circuit and configured to act on the second coil resonance circuit, so as to change the amplitude of the current or voltage resonant wave generated by the electromagnetic induction between the second coil resonance circuit and the first coil after receiving the data signal.

3. The wireless power supply communication circuit of claim 2, wherein, the second coil resonance circuit comprises a second coil, and at least one first capacitor coupled to two ends of the second coil and arranged in parallel with each other, the two ends of the second coil are coupled to the rectification module.

4. The wireless power supply communication circuit of claim 2, wherein, the second coil resonance circuit comprises a second coil, at least one first capacitor coupled to two ends of the second coil and arranged in parallel with each other, and a second capacitor coupled in series with the first capacitor, the two ends of the second coil are coupled to the rectification module.

5. The wireless power supply communication circuit of claim 3, wherein, the first coil and the second coil are coaxially arranged.

6. An electric cooking pot, comprising the wireless power supply communication circuit of claim 1.

7. The electric cooking pot of claim 6, wherein,
an insertion base is provided on the pot body;
an insertion cavity is provided on the upper cover and the insertion base movably inserts the insertion cavity cooperatively;
the first coil is provided on the insertion base and the second coil resonance circuit is provided in or near the insertion cavity; and
the pot body control unit is provided on the pot body and the upper cover control unit is provided on the upper cover.

8. The electric cooking pot of claim 7, wherein, the insertion base is hinged on an articulated shaft arranged on the pot body.

9. The electric cooking pot of claim 8, wherein, a rotation angle of the insertion base about the articulated shaft is 0-95°.

10. The electric cooking pot of claim 8, wherein, the insertion base comprises a base hinged on the articulated shaft, and an insertion head vertical to the plane of the base is provided above the base; the insertion cavity comprises a base cavity and an insertion head cavity, the base is inserted the base cavity cooperatively, and the insertion head is inserted the insertion head cavity cooperatively.

11. The electric cooking pot of claim 10, wherein, the first coil is arranged in the insertion head.

12. The electric cooking pot of claim 7, wherein, the insertion base and the insertion cavity are connected by movable engagement.

13. The electric cooking pot of claim 12, wherein, a chuck slot is provided in the insertion cavity, and an elastic chuck is provided on the surface of the insertion base, the elastic chuck is engaged with the chuck slot.

* * * * *